XR 3,501,587
CROSS REFERENCE

March 17, 1970 D. R. HERRIOTT 3,501,587

IN-LINE HOLOGRAPHIC ARRANGEMENT FOR IMAGING A PERSON VIEWING A TELEVISION SCREEN

Filed Dec. 21, 1966

INVENTOR
D.R. HERRIOTT
BY Wilford L. Wisner
ATTORNEY

3501587
OR IN 178/6.7R

United States Patent Office 3,501,587
Patented Mar. 17, 1970

3,501,587

IN-LINE HOLOGRAPHIC ARRANGEMENT FOR IMAGING A PERSON VIEWING A TELEVISION SCREEN

Donald R. Herriott, Morris Township, Morris County, N.J., assignor to Bell Telephone Laboratories, Incorporated, Murray Hill and Berkeley Heights, N.J., a corporation of New York Filed Dec. 21, 1966, Ser. No. 603,550
Int. Cl. H04n 3/00, 5/84
U.S. Cl. 178—6.7 4 Claims

ABSTRACT OF THE DISCLOSURE

Methods are disclosed whereby a camera can obtain a clear image, through a television screen, of a person watching that screen. For example, between the television screen and the camera there is located a focusing device and a hologram that is a record of the interference between focused light that previously passed through the screen and a coherent reference beam. The camera is oriented to receive the conjugate order light diffracted by the hologram.

Figures 1, 2:
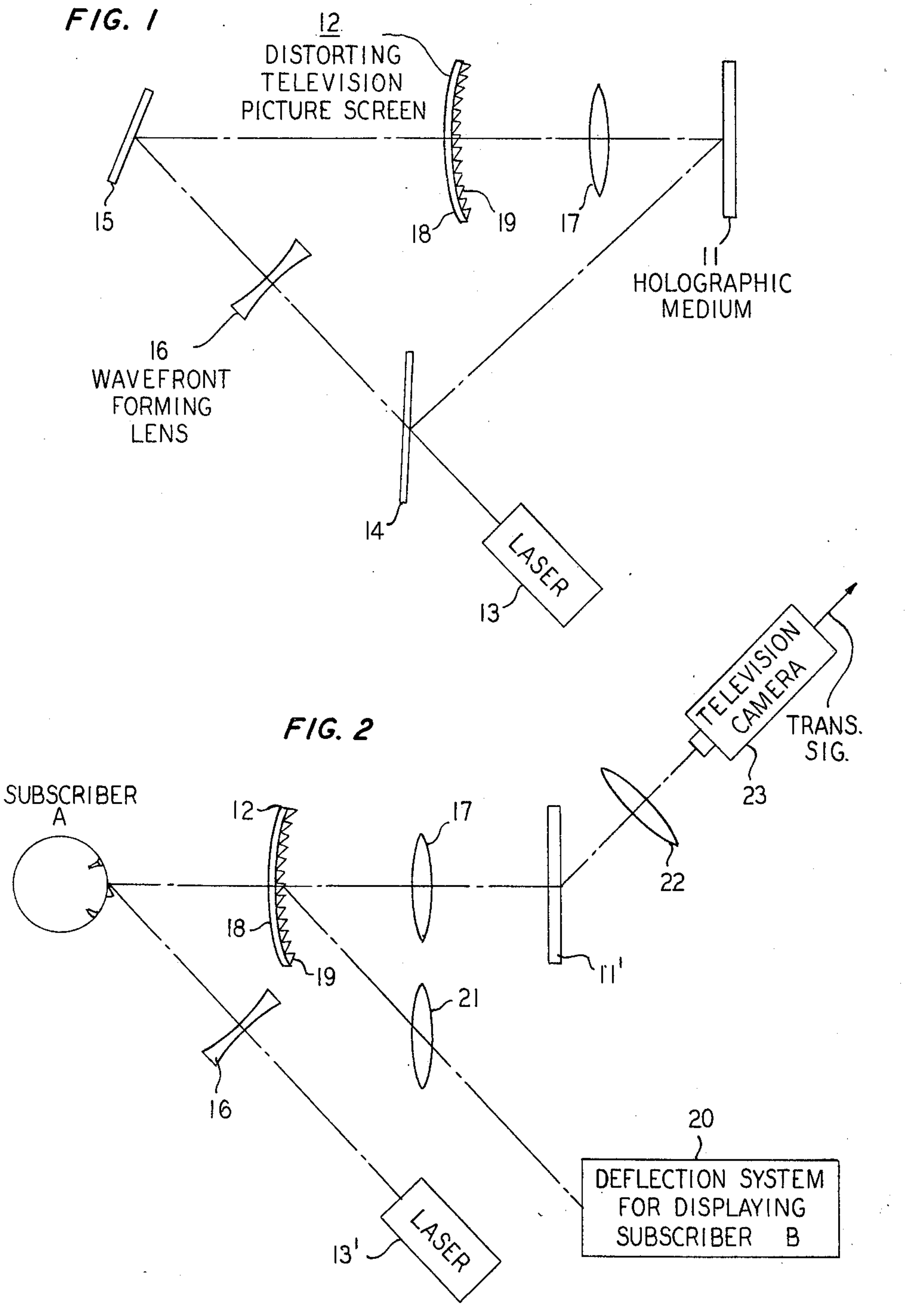

Related subject matter is disclosed in the concurrently-filed application of H. W. Kogelnik, application Ser. No. 603,551, and in the concurrently-filed application of R. J. Collier and K. S. Pennington, application Ser. No. 603,496, both assigned to the assignee hereof.

In the concurrently-filed application of Herwig W. Kogelnik, a method is disclosed for obtaining clear images of objects through a relatively thin distorting medium.

My invention relates to an extension of that method to television-type communication systems for facilitating eye contact between communicating persons whose changing images are being transmitted while they talk. By eye contact, I mean that the eyes of the image of one communicating party appear to look directly at the other communicating party, who is viewing the image.

Heretofore, eye contact has not been feasible because it would be necessary for the television camera to view each communicating party through the viewing screen, which introduces an unacceptable amount of distortion in the image transmitted to the camera.

My invention resides in the recognition that, by appropriate application of the above-mentioned Kogelnik method, the camera can obtain a clear image, through a television screen, of a person watching that screen. To this end, optically between the screen and the camera there are disposed a focusing device and a photographic film that has been previously exposed to both coherent light passed through the screen and focused to an image and coherent light not passed through the screen. The camera is oriented to receive the conjugate-order diffracted light from the developed film.

Further feautres and advantages of the present invention will become apparent from the following detailed description, taken together with the drawing, in which:

FIG. 1 shows, in pictorial and block diagrammatic form, an arrangement for performing the exposure step of a preferred method according to my invention; and FIG. 2 shows, in pictorial and block diagrammatic form, an arrangement for performing the white light reconstruction step of the preferred method.

In FIG. 1, a holographic medium 11, such as a high-resolution photographic film that is as thin as practical is exposed by the preferred method of the present invention. The purpose of the exposure is to record the inhomogeneities or distortions of the television picture screen 12, which illustratively comprises a ground glass plate 18 backed by a Fresnel lens 19. The record of the distortions is to be used to compensate for the distortions so that a clear image of any arbitrary object appearing on the normal viewing side (left-hand side of screen 12 in FIG. 1) can be obtained via transmission of scattered light through the screen. Illustratively, the system described is a television-telephone system; and the object will be a subscriber, as shown in FIG. 2. Such an image will be obtainable even when another, unrelated image is being transmitted in the reverse direction therethrough or is displayed on the viewing face of the ground glass plate 18. Although the recorded distortion is the quiescent distortion, it does not differ significantly from the distortion during simultaneous display of the unrelated image.

The holographic medium 11 is exposed by projecting one beam, hereinafter designated the object wavefront, from the laser 13 through the partially transmissive reflector 14 and the wavefront-forming lens 16. The object wavefront is further reflected from the reflector 15 to pass through the picture screen 12. Thereafter, the transmitted light is imaged by the lens 17 upon the holographic medium. A second beam, hereinafter designated the reference beam, also participates in the exposure and is formed by the portion of the laser light reflected from the partially transmissive reflector 14 to propagate toward the holographic medium at an acute angle with respect to the direction of propagation of the object wavefront.

The lens 16, illustratively a diverging lens, forms the object wavefront into a spherical wavefront. The converging lens 17 is disposed between the picture screen 12 and the holographic medium 11 so that the latter is positioned at the image position of the former. In other words, $$\frac{1}{p}+\frac{1}{q}=\frac{1}{f} \quad (1)$$

where $f$ is the focal length lens 17, $p$ is the spacing between the picture screen 12 and the lens, and $q$ is the spacing between the lens and the holographic medium 11. Optionally, in order to provide that the developed hologram does not have a magnification or demagnification effect, the power of the wavefront-forming lens 16 is selected to provide a radius of curvature of the spherical object wavefront, at the plane of the medium 11, that is substantially equal to the curvature of the wavefront of the reference beam at the plane of the medium 11. It should be noted that the lens 16 could be replaced with a converging lens placed more than a focal length away from the picture screen 12. The wavefront at the screen 12 would still be spherical.

The ground glass plate 18 of the picture screen 12 is employed therein in order to diffuse the light of the television scanning beam that displays the received signal thereon. The Fresnel lens 19 of the picture screen 12 is employed therein to redirect the obliquely incident television scanning beam, as will be described in more detail hereinafter in connection with FIG. 2.

Both the ground glass plate 18 and the Fresnel lens 19 introduce distortions to an image transmitted therethrough by scattered light. In order to obtain an image of the person viewing the screen 12 for reverse transmission to a remote station, the image is nearly always obtained by light scattered from that person. Nevertheless, it should be understood that my invention can be employed wherever the viewing screen or apparatus introduces distortion to an image transmitted therethrough, at least when the distortions all occur in a region that is relatively thin in the direction of transmission of light. The distorting region is sufficiently thin when it provides substantially only phase distortions without appreciable additional intensity distortion of the transmitted wavefront.

The laser 13 is illustratively a helium-neon laser operating at a wavelength of 6,328 angstrom units, which is red light.

In the execution of the exposure step, the two beams expose the holographic medium 11 to form what may be called an "image-hologram," since the use of the lens 17 and the thinness of the picture screen 12 provide a one-to-one correspondence between distorting regions of the screen 12 and corresponding regions of the medium 11. Typically, means would be employed to shield the holographic medium 11 from background light and to shutter the two beams to expose the medium 11 to the two beams simultaneously for a brief exposure period. Such means are well known in the art and are not illustrated in FIG. 1. The exposed medium 11 is then developed in the manner of any photographic film, although it optionally may be bleached by techniques now well known in holography to make a phase hologram.

The one-to-one correspondence between distorting regions of the screen 12 and regions of the developed hologram facilitates the cancellation of the effect of the distortions via the employment of the so-called conjugate-order image during use of the developed hologram, as depicted in FIG. 2.

In FIG. 2, the developed hologram 11', which was exposed in the manner depicted in FIG. 1, is replaced at the same distance from lens 17. It is illuminated by coherent light scattered from the viewer, designated subscriber A, and transmitted through the distorting picture screen 12. With respect to the hologram, this illuminating light is incident essentially parallel to the direction of incidence of the object wavefront during exposure. The spacing between the picture screen 12 and the lens 17 remains the same as in FIG. 1.

Illustratively, the subscriber A is watching the image of a subscriber B displayed upon the screen 12 by a beam of light scanned and modulated by the deflection system 20 and imaged upon the screen 12 by the lens 21. This beam, which is obliquely incident upon the screen 12, is redirected essentially normal to the ground glass plate 18 by the Fresnel lens 19, in a manner known in the optic art. The grooves of the Fresnel lens are cut to have sides at angles appropriate for this purpose. Length-to-width distortion of the displayed image of subscriber B is avoided by maintaining the image plane of system 20, that is, the object plane of lens 21, essentially parallel to a central tangent plane of picture screen 12 and by maintaining the axis of the lens 21 perpendicular to the aforesaid planes.

In order to obtain the image of subscriber A to be transmitted to subscriber B, a helium-neon red laser 13' illuminates subscriber A through suitable optics, optionally the same wavefront-forming lens 16 as was employed in FIG. 1. A television camera 23 is disposed to receive the light transmitted through the hologram 11' and diffracted in a direction corresponding to the conjugate-order image. The direction of propagation of the diffracted light is essentially parallel to the direction of propagation of the reference beam during exposure. This conjugate-order diffracted light is a portion of the light incident upon the hologram 11', which portion is affected by the previously recorded interferences in such a way that modulation of the diffracted wavefront due to the distorting picture screen 12 is cancelled. Mathematically, the cancellation process is described by the multiplication of an exponential term with complex exponent and another exponential term with a complex conjugate exponent so that the resulting wavefront that is received by camera 23 is merely an attenuated version of an image of subscriber A, as viewed directly. Illustratively a field lens 22 is disposed in the transmission path of the diffracted light to camera 23 in order to collect and direct a sufficient portion of it into the optics of camera 23. The image obtained in the television camera 23 is scanned and transmitted in the manner usual in television systems.

It should be noted that the television camera 23 has obtained the image of subscriber A, for transmission to subscriber B, directly through the picture screen 12 at which subscriber A was looking. Illustratively, the same method is employed at subscriber B's station so that both subscribers are looking directly into the respective cameras and effectively establish eye contact.

Although the laser 13' is illustratively a helium-neon laser operating at 6,328 angstrom units wavelength, my invention is also adaptable to white light reconstruction techniques as illustrated in FIGS. 7 and 8 of the above-cited concurrently-filed patent application of H. W. Kogelnik.

Another modification of my invention would involve the employment of an image-hologram immediately behind and in such close proximity to the picture screen 12 that the combination of the two essentially would become a nearly clear glass plate. In order to display the image of subscriber B upon the picture screen 12 under such circumstances, it would be necessary to project the scanning light beam from subscriber A's side of the ground glass plate 18 and to tolerate the loss of a very substantial portion of the scanning light which would be transmitted through the combination of screen and hologram rather than being scattered reflectively from the surface of ground glass plate 18.

The hologram for such a scheme could be exposed as shown in FIG. 1 or could be exposed precisely in the position in which it is to be used. In the former case, the effect of the small displacement between screen and hologram during use would be to reduce the angular aperture of the combination, the angular aperture being the angle within which a clear image can be transmitted through the combination to the television camera. In the latter case, it would be necessary to employ a reference beam incident upon the side of the holographic medium that is opposite to the side upon which the object beam is incident.

As described in the above-cited concurrently-filed application of H. W. Kogelnik, the hologram may be bleached to convert intensity variations of the interference fringes into phase retardation variations. This technique would be employed when it is desired that the developed hologram be as transmissive as possible.

The choice of the laser employed in practicing my invention is optional, although it is desirable that the laser have an intensity sufficiently high to permit the usual losses.

Various other modifications of the present invention, within its spirit and scope, should be apparent to those skilled in the art. For example, it should be understood that the use of planar wavefronts is a special case of the use of spherically curved wavefronts, in which the radius of curvature is infinite.

What is claimed is:

1. A method of obtaining clear images of objects through a television viewing screen, comprising the steps of forming an interference pattern responsive to the optical distortion of the viewing screen, including the steps of
  projecting an essentially spherical light wavefront through the screen,
  directing a coherent reference beam to interfere with said wavefront after said wavefront has passed through the screen,
  focusing said wavefront to image the screen in a plane of interference of said wavefront and said beam,
recording the interference pattern, and
employing the recorded pattern to compensate for the optical distortion of the screen, including the steps of
  illuminating a first object to be televised for viewing at a remote station, focusing the light scattered from the first object through the screen upon the record of the interference pattern at the image plane with respect to the distorting medium, and receiving the conjugate-order portion of light diffracted from the record in a television camera.

2. A method according to claim 1 in which the step of employing the recorded pattern includes the step of displaying the image of a second object televised from the remote station upon the viewing screen simultaneously with the scattering of light from the first object through the screen.

3. A method according to claim 2 in which the displaying step includes scanning the surface of the viewing screen with a light beam responsive to the signal received from the remote station, the scanning being accomplished at oblique incidence upon the viewing screen, and redirecting the incident scanning beam into the viewing screen essentially normal to the surface thereof.

4. A method of obtaining clear images of local objects through the viewing screen of a television-telephone set in which an image of a distant object is formed on the screen in response to a received signal, comprising the steps of forming a permanent interference pattern responsive to the quiescent optical distortion of the screen, including the steps of projecting an essentially spherical coherent light wavefront through the screen, focusing said wavefront to an image in a photographic film disposed at the image plane with respect to the screen, directing a coherent reference beam to propagate obliquely with respect to the direction of propagation of said wavefront and interfere therewith at said film, developing the film, restoring the developed film to the image plane, and employing the developed film to compensate for the quiescent optical distortion of the screen, comprising the steps of illuminating a local object to be televised for viewing at a remote station, focusing the light scattered from the object and passed through the screen upon the developed film at the image plane with respect to the screen, and receiving the conjugate-order portion of light diffracted from the developed film in a television camera.

References Cited

Holographic Imagery Through Diffusing Media, Journal of the Optical Society of America, vol. 56, No. 4, p. 523.

Correction of Lens Aberrations By Means of Holograms, Applied Optics, vol. 5, No. 4, pp. 589–593.

ROBERT L. GRIFFITH, Primary Examiner

DONALD E. STOUT, Assistant Examiner

U.S. Cl. X.R.

350—3.5